United States Patent
Bruckner

(10) Patent No.: US 11,227,265 B2
(45) Date of Patent: Jan. 18, 2022

(54) DISTRIBUTED TRANSACTION SYSTEM

(71) Applicant: EURONET USA LLC, Little Rock, AR (US)

(72) Inventor: Martin Bruckner, Martinsried (DE)

(73) Assignee: EURONET USA LLC, Little Rock, AR (US)

( * ) Notice: Subject to any disclaimer, the term of this patent is extended or adjusted under 35 U.S.C. 154(b) by 706 days.

(21) Appl. No.: 15/313,048

(22) PCT Filed: May 21, 2015

(86) PCT No.: PCT/EP2015/061320
§ 371 (c)(1),
(2) Date: Nov. 21, 2016

(87) PCT Pub. No.: WO2015/177305
PCT Pub. Date: Nov. 26, 2015

(65) Prior Publication Data
US 2017/0185973 A1   Jun. 29, 2017

(30) Foreign Application Priority Data
May 21, 2014   (GB) ................... 1409051

(51) Int. Cl.
G06Q 40/02   (2012.01)
G06Q 20/02   (2012.01)
(Continued)

(52) U.S. Cl.
CPC ....... G06Q 20/027 (2013.01); G06F 9/44526 (2013.01); G06Q 20/10 (2013.01);
(Continued)

(58) Field of Classification Search
CPC .... H04Q 3/62; G06F 9/44526; G06Q 20/027; G06Q 20/08; G06Q 20/10; G06Q 20/16;
(Continued)

(56) References Cited

U.S. PATENT DOCUMENTS 5,944,784 A * 8/1999 Simonoff ................ G06F 9/545
709/202
6,148,336 A * 11/2000 Thomas ............... H04L 41/0893
709/223
(Continued)

FOREIGN PATENT DOCUMENTS

CN      101410803 A     4/2009
FR      2635602 A1 *    2/1990   ............. G06Q 40/02
(Continued)

OTHER PUBLICATIONS

Refka Abdellaoui, Marc Pasquet, Secure Communication for Internet Payment in Heterogeneous Networks, Apr. 1, 2010, IEEE, web, 1085-1092 (Year: 2010).*
(Continued)

*Primary Examiner* — I Jung Liu
(74) *Attorney, Agent, or Firm* — Seed Intellectual Property Law Group LLP

(57) ABSTRACT

A financial transaction system providing a financial switching engine, the financial transaction system comprising: a distributed plurality of different physical data centres implemented at different respective physical locations, connected together via a private network; a plurality of plugins each configured to perform a different respective function of the financial transaction system; and an operating system on which the plugins run, the plugins being configured to communicate messages with one another in order to perform financial transactions; wherein the plugins are distributed amongst some or all of the data centres and the operating system is configured to abstract the plugins from the distributed data centres, such that the plugins communicate said messages with one another via the operating system without needing to specify particular ones of said data centres as destinations of the messages, while the operating system
(Continued)

handles routing of the messages between the data centres over the private network without the plugins needing visibility of the routing.

20 Claims, 4 Drawing Sheets

(51) Int. Cl.
| | |
|---|---|
| *G06Q 20/10* | (2012.01) |
| *G06Q 20/20* | (2012.01) |
| *H04L 29/08* | (2006.01) |
| *G06F 9/445* | (2018.01) |
| *G06Q 20/16* | (2012.01) |
| *G06Q 20/18* | (2012.01) |
| *H04L 12/24* | (2006.01) |
| *G06Q 20/08* | (2012.01) |
| *H04L 29/06* | (2006.01) |

(52) U.S. Cl.
CPC ............ *G06Q 20/16* (2013.01); *G06Q 20/18* (2013.01); *G06Q 20/20* (2013.01); *G06Q 40/02* (2013.01); *H04L 41/0246* (2013.01); *H04L 67/12* (2013.01); *H04L 67/327* (2013.01); *G06Q 20/08* (2013.01); *H04L 63/00* (2013.01)

(58) Field of Classification Search
CPC ........ G06Q 20/18; G06Q 20/20; G06Q 40/02; G06Q 40/00; H04L 41/0246; H04L 63/00; H04L 67/12; H04L 67/327
USPC ........................................................... 705/39
See application file for complete search history.

(56) References Cited

U.S. PATENT DOCUMENTS

| | | | | |
|---|---|---|---|---|
| 7,502,752 | B1* | 3/2009 | Lemons | G06Q 20/108 370/354 |
| 2001/0018674 | A1 | 8/2001 | Schein et al. | |
| 2003/0014560 | A1* | 1/2003 | Mugica | G06F 8/20 719/320 |
| 2003/0191757 | A1 | 10/2003 | Ambrosini et al. | |
| 2003/0233327 | A1 | 12/2003 | Keresman, III et al. | |
| 2004/0078499 | A1* | 4/2004 | Karaorman | G06F 9/542 710/22 |
| 2005/0251809 | A1* | 11/2005 | Gunduc | G06F 9/44526 719/310 |
| 2007/0171921 | A1 | 7/2007 | Wookey et al. | |
| 2007/0174429 | A1* | 7/2007 | Mazzaferri | G06F 3/1415 709/218 |
| 2008/0040470 | A1 | 2/2008 | Bogner | |
| 2008/0235710 | A1* | 9/2008 | Challenger | G06F 9/5027 719/316 |
| 2008/0294712 | A1 | 11/2008 | Lu et al. | |
| 2008/0299947 | A1 | 12/2008 | Litttle | |
| 2010/0146085 | A1* | 6/2010 | Van Wie | H04L 67/34 709/220 |
| 2010/0280909 | A1 | 11/2010 | Zhang et al. | |
| 2012/0233668 | A1* | 9/2012 | Leafe | G06F 9/00 709/226 |
| 2014/0067567 | A1 | 3/2014 | Cooke et al. | |
| 2014/0098758 | A1* | 4/2014 | Cheng | H04W 4/24 370/329 |

FOREIGN PATENT DOCUMENTS

| | | |
|---|---|---|
| JP | 2002-108683 A | 4/2002 |
| JP | 2005-523505 A | 8/2005 |
| JP | 2007-518175 A | 7/2007 |
| RU | 2 094 846 C1 | 10/1997 |
| WO | 02/13120 A1 | 2/2002 |
| WO | 03/090027 A2 | 10/2003 |
| WO | 2005/069237 A2 | 7/2005 |

OTHER PUBLICATIONS

International Search Report for International Application No. PCT/EP2015/061320 dated Jul. 27, 2015 (3 pgs.).

Japanese Office Action, dated May 21, 2019, for Japanese Application No. 2017-513343, 11 pages. (with English Translation).

JavaWorld PR, "Achieving high-performance financial system with low cost," Magazine "Java World," Japan, IDG Japan co. ltd., vol. 7, No. 1, Jan. 1, 2003. (with English Translation).

Yoshiyama K., "Overcoming difficulty for development of web system," URL=https://web.archive.org/web/20071006154423/https://www.cac.co.jp/softechs/pdf/st2502_04.pdf, accessed May 15, 2019, Oct. 6, 2007, pp. 18-24. (with English Translation).

Chinese Office Action issued in Chinese Application No. 201580037615.4, dated Mar. 5, 2020, 21 pages. (with English Language Translation).

"CORBA: Catching the Next Wave," Jun. 5, 1997, retrieved from https://docs.huihoo.com/corba/1/index.html, retrieved on May 15, 2020, 14 pages.

"Hardware security module," Wikipedia, retrieved on Sep. 16, 2010, 3 pages.

Migliardi et al., "Plug-ins, layered services and behavioral objects Application programming styles in the Harness metacomputing system," *Future Generation Computer Systems* 17:795-811, 2001.

* cited by examiner

DISTRIBUTED TRANSACTION SYSTEM

TECHNICAL FIELD

The present disclosure relates to the field of financial switching engines for performing financial transactions.

BACKGROUND

It is known to provide a financial transaction system for performing financial transactions between various elements, e.g. to route a transaction initiated from an automatic teller machine (ATM) or point-of-sale (PoS) terminal to the settlement system of a financial service provider, or to top-up a prepaid account such as a prepaid phone-time account from an ATM or PoS terminal. The system includes a financial switching engine which receives transaction messages from one element of the system, and comprises a set of rules for directing them to another. The switching engine receives a message, examines its content, and applies the rules to the content in order to makes a decision about where to forward the message.

The financial transaction system can also include other functions associated with the performance of financial transactions, e.g. for checking an account balance or generating other reports, logging transactions in a database, or monitoring an account to generate alerts. Euronet application WO 02/13120 discloses a system comprising a plurality of interchangeable, standard-interface, modular financial service applications, each providing a different respective financial service, e.g. one for account access, one for account management, one for transaction management and one for event messaging.

In existing transaction systems, the system including the switch and other financial functions are implemented together at a central data centre connecting outwards to its various endpoints (e.g. ATMs, PoS systems, and/or financial provider settlement systems) via one or more data networks. The data centre may be arranged as a central element mediating between a plurality of different financial networks (e.g. one or more ATM networks, PoS network and/or financial provider networks). There may also be provided a back-up data centre in case of failure of the main data centre.

SUMMARY

The existing approach may be described as an "active-passive" approach in that at any one time, only one of the data centres is active. In normal operation the main data centre is active while the back-up data centre is dormant; and in case of failure of the main data centre, the back-up data centre is active while the main data centre is not functioning.

The present disclosure on the other hand provides an "active-active" approach where different data centres are active at any one time. Furthermore, the present disclosure extends this idea to a distributed, cloud-based approach where multiple different modular plugin applications are distributed amongst a plurality of different data centres over a plurality of different physical locations.

According to one aspect disclosed herein, there is provided a financial transaction system providing a financial switching engine, the financial transaction system comprising: a distributed plurality of different physical data centres implemented at different respective physical locations, connected together via a private network; a plurality of plugins each configured to perform a different respective function of the financial transaction system; and an operating system on which the plugins run, the plugins being configured to communicate messages with one another in order to perform financial transactions; wherein the plugins are distributed amongst some or all of the data centres and the operating system is configured to abstract the plugins from the distributed data centres, such that the plugins communicate said messages with one another via the operating system without needing to specify particular ones of said data centres as destinations of the messages, while the operating system handles routing of the messages between the data centres over the private network without the plugins needing visibility of the routing.

In embodiments, preferably the financial switching engine is one of said plugins.

Where it is said that the plugins are distributed amongst data centres, this means that different ones of the plugins are stored and/or executed on different ones of the data centres, and/or that an instance of each of one or more of the plugins is physically stored and/or executed on multiple data centres (i.e. a given plugin is physically stored and/or executed on two or more of the data centres). In the latter case, this may mean that the burden for storing and/or executing a given plugin is shared between multiple data centres, and/or that multiple instances of the plugin are stored and/or executed on different data centres.

For example, the financial switching engine may be stored and/or executed on one data centre while another plugin involved in a transaction switched by the switching engine (e.g. a credit card transaction processing plugin, a prepaid account plugin, or an ATM or point-of-sale terminal interface plugin) may be stored and/or executed on another data centre. Alternatively or additionally, multiple instances of any given plugin such as the financial switching engine may be stored and/or executed on a plurality of different data centres.

Further, the plugins do not need to know which data centre they are implemented on or which data centres the plugins they are communicating with is implemented on, and do not need to be programmed to have any visibility or understanding of the underlying distributed nature of the system. Rather, the plugin just sends a message to the operating system and the operating system handles the underlying physical routing in a manner that is opaque to the plugins. Thus the system effectively acts as a kind of "private cloud", with the operating system providing an abstraction layer such that the system acts as one logical data centre from the perspective of the plugins.

The distributed system of the present disclosure may be used to obtain one or more of the following advantages. Firstly, in case of failure of one data centre, the rest of the system can continue to operate with zero downtime except for any modules or instances of any modules (if any) implemented exclusively on the failing data centre. Further, plugins and/or data centres can be upgraded with zero downtime to the rest of the system. Further, it can provide improved opportunities for load balancing, and/or improved scalability.

In embodiments, preferably the plugins include at least one security module configured to apply cryptography and/or one or more other security measures to ones of said transactions.

In embodiments, preferably the security module comprises a Hardware Security Module.

In embodiments, preferably the plugins include one or more endpoint interface modules each configured to interface with one or more financial service endpoint terminals.

In embodiments, preferably the one or more endpoint interface modules comprise a point-of-sale interface module configured to interface with one or more point-of-sale terminals.

In embodiments, preferably the one or more endpoint interface modules comprise an ATM interface module configured to interface with one or more automatic teller machines.

In embodiments, preferably the plugins include a credit and/or debit card transaction processing module configured to process debit and/or credit card transactions by interfacing with a financial provider system.

In embodiments, preferably the plugins include an online transaction processing module.

In embodiments, preferably the plugins include one or more prepay transaction plugins configured to process transactions to top-up and/or redeem prepaid account credit for a prepaid good or service by interfacing with the prepaid account.

In embodiments, preferably the one or more prepay transaction plugins comprise a prepay phone plugin configured to process transactions to top-up or redeem prepaid phone credit.

In embodiments, preferably the plugins include a message filtering plugin configured to filter said messages.

In embodiments, preferably the plugins include a reporting module configured to report on ones of said transactions and/or to report on an account status.

In embodiments, preferably the plugins include a logging module for logging ones of said transactions in a database.

In embodiments, preferably the operating system comprises a load management algorithm configured to perform load balancing between the data centres.

In embodiments, preferably the operating system comprises a cost-of-routing algorithm configured to determine an optimal route for said messages amongst the data centres.

In embodiments, preferably the operating system is distributed amongst some or all of said physical data centres.

In embodiments, preferably the operating system is configured to support different communication protocols for communicating ones of said messages between plugins.

In embodiments, preferably said plugins include a protocol conversion plugin configured to perform said conversion.

In embodiments, preferably the operating system is configured to interpret different programming languages in order to run different ones of the plugins programmed in the different programming languages.

In embodiments, preferably the system comprises a database for logging ones of said transactions, and/or storing configuration parameters and/or transaction rules of the system.

In embodiments, preferably the system comprises a data abstraction layer configured to support plurality of database types In embodiments, preferably the data abstraction layer is one of said plugins.

In embodiments, preferably the data centres are located in different buildings, different towns or cities, and/or different countries.

In embodiments, preferably the private network comprises a private network infrastructure.

In embodiments, preferably the private network comprises a private protocol implemented over a public network infrastructure.

According to another aspect disclosed herein, there is provided a computer program product providing a financial switching engine, the computer program product comprising code embodied on a computer-readable storage medium and configured so as when executed on one or more processors to perform operations of: acting as an operating system to run a plurality of plugins each configured to perform a different respective function of a financial transaction system; and communicating messages between the plugins in order to perform financial transactions; wherein the plugins are distributed amongst some or all of the data centres and the operating system is configured to abstract the plugins from the distributed data centres, such that the plugins communicate said messages with one another via the operating system without needing to specify particular ones of said data centres as destinations of the messages, while the operating system handles routing of the messages between the data centres over the private network without the plugins needing visibility of the routing.

BRIEF DESCRIPTION OF THE DRAWINGS

To assist understanding of the following description and to show how embodiments may be put into effect, reference is made by way of example to the accompanying drawings in which.

DETAILED DESCRIPTION OF EMBODIMENTS

Figure 1:
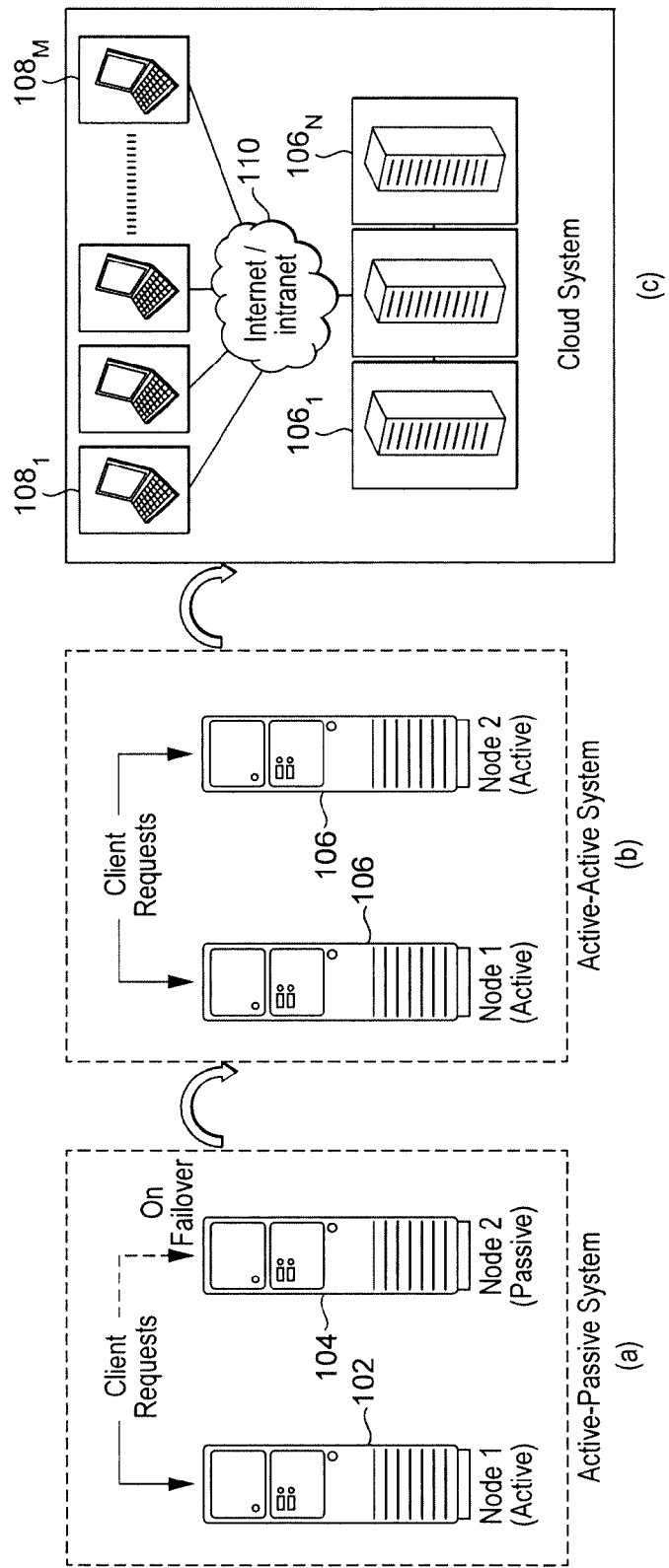
FIG. 1 schematically illustrates centralised and distributed approaches to implementing a financial transaction system, FIG. 2 schematically illustrates a high-level architecture of a financial transaction system, FIG. 3 schematically illustrates a distributed implementation of a financial transaction system, and FIG. 4 schematically illustrates a transaction formed from a plurality of plugin instances.

FIG. 1 illustrates the concept of an active-active approach relative to the passive-active approach, and the extension of the active-active idea to a fully distributed, cloud based approach.

FIG. 1(a) shows an active-passive implementation comprising a main data centre 102 and a back-up data centre 104. When a client request is received from a service endpoint terminal (e.g. PoS terminal or ATM), the request message is routed to the main data centre 102 to be processed. Assuming the main data centre 102 is operative then all such client request messages are routed only to the main data centre 102. Only in case of failure such that the main data centre is not operative, request messages are instead routed to the back-up data centre 104 to be processed. Hence at any one time only one of the data centres 102, 104 is active.

FIG. 1(b) illustrates the idea of an active-active implementation comprising two (or more) data centres 106, neither of which need necessarily be considered the "main" data centre. When a client request is received from a service endpoint terminal (e.g. PoS terminal or ATM), it may be routed to either of the data centres 106 to be processed depending on the request. Thus some client request message are routed to one data centre 106 and other such message are routed to the other data centre 106, with both data centres being active processing different requests at substantially the same time.

FIG. 1(c) shows an extension of the active-active approach to a cloud system in accordance with embodiments disclosed herein. The system comprise a plurality of physical data centres 106 distributed over a plurality of physical locations, e.g. different buildings, different sites, different towns or cities, or even different countries. The different physical data centres 106 may each be associated with multiple servers and/or devices. The different physical data centres 106 are connected together via a private network 110. The private network 110 may be implemented by means of a private physical network infrastructure, or by means of a private (secure) network protocol implemented over a public physical network infrastructure such as the Internet, or by a combination of these. A plurality of service endpoint terminals 108 (e.g. PoS terminals and/or ATMs) are also connected to the private network 110, and are thus operable to communicate with any of the distributed data centres 106 via the private network. At any given time, any two, more or all of the different distributed data centres 106 may be active and processing transactions in parallel. When a service request message is sent from a service end-point 108 it may be directed to any one or more of the data centres depending on factors such as the nature of the request, the current load on the system and the cost of routing the message. In the cloud approach a plurality of physical processing centres can be represented by a logical processing centre. In an embodiment many physical processing centres can be represented by a single, large logical processing centre. In other words in some embodiments the physical processing centres 106 are comprised in a "cloud" which a customer can connect to using endpoint terminals 108 via the internet/intranet 110, which may be a private network.

Figure 2:
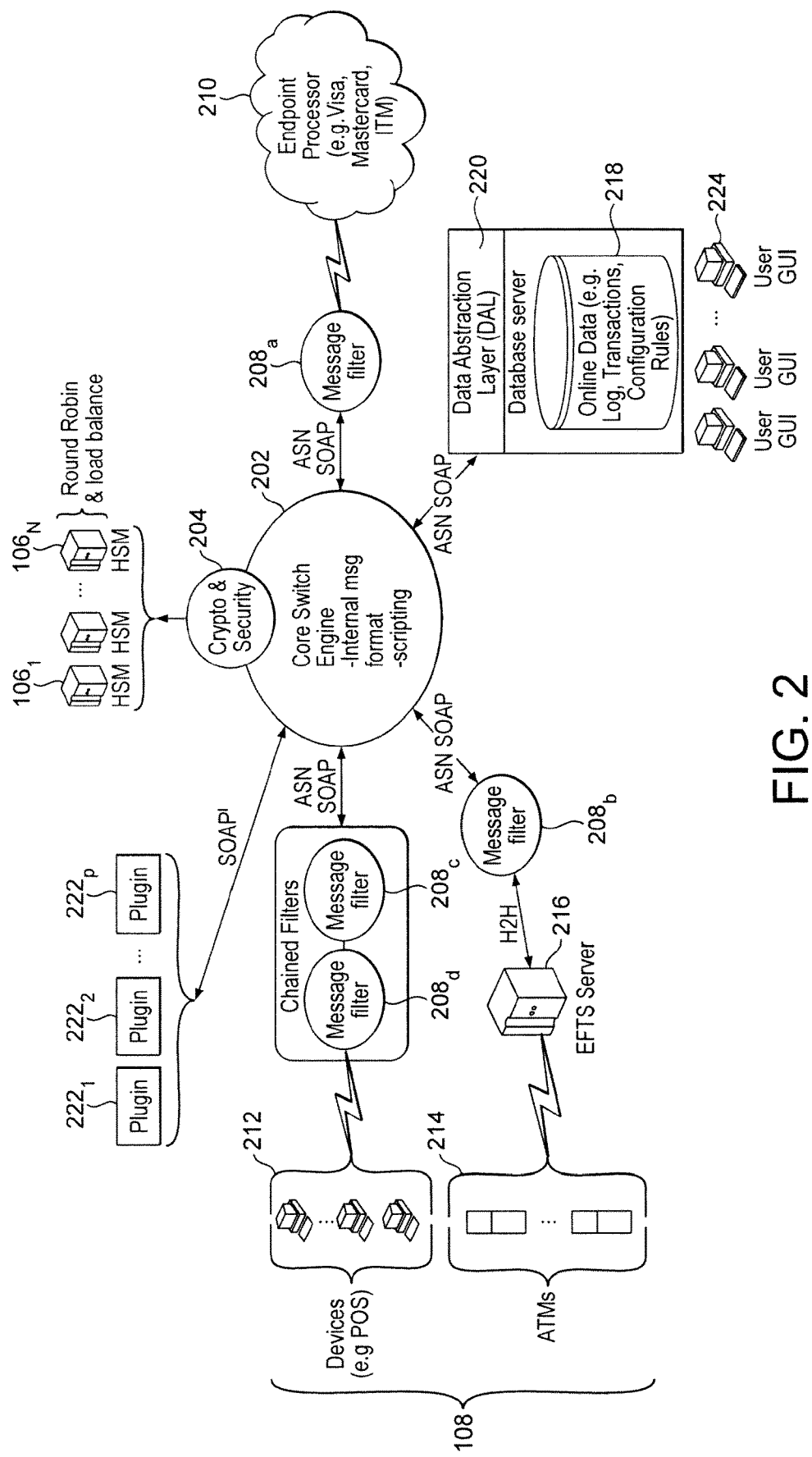

FIG. 2 shows the architecture of a financial transaction system in accordance with exemplary embodiments disclosed herein. The main function of the system is to provide a financial switching engine, acting as an intermediary between a plurality of service end-point terminals 108 (which are user terminals) and one or more financial providers 210 (the systems at the other endpoint of the transaction where the transaction is ultimately processed). To this end the system comprises a financial switching engine 202 (the core switch) and a plurality of message filters 208 which act as interfaces or device handlers. The system also comprises a plurality of additional elements which can be involved in the transactions. In FIG. 2, these comprise for example at least one security module 204, and a data abstraction layer (DAL) 220 for interfacing with a database 218.

The service endpoint terminals 108 may comprise for example one or more point-of-sale (PoS) terminals 212, and/or one or more automatic teller machines (ATMs). The financial provider systems 210 may comprise for example the settlement systems of one or more credit or debit card providers, an online banking system, and/or the prepaid account system of one or more providers of prepaid goods or services. The financial switching engine 202 is connected to the service endpoint terminals 108 via one or more message filters 208, e.g. being connected to each type of service endpoint terminal 212, 214 via at least one respective message filter, and via any respective infrastructure of the endpoints 108. For example in FIG. 2 the financial switching engine 202 may be connected to the ATMs 214 via one or more message filters 208b and an ATM network comprising an EFTS (electronic funds transfer server) 216, and may be connected to the PoS terminals 212 via one or more message filters 208c, 208d and a point-of-sale network (not shown). The financial switching engine 202 is also connected to the one or more provider systems 210 via one or more message filters 208, e.g. being connected to each provider 210 via at least one respective filter 208a.

The financial switching engine 202 is thus disposed between the service end-point terminals 108 and the provider systems 210. The financial switching engine 202 is configured to receive messages, examine their content and based thereon switch them onwards to the appropriate element of the system according to a set of switching rules. For example this may comprise receiving a service request message from a service endpoint device 108 via the respective filter(s) 208b, 208c, 208d, then reading at least enough of the message to determine the nature of the request and forwarding via another filter 208a to the appropriate provider 210 for processing, as well as potentially forwarding the message or information about it to the database 218 via the DAL 220 to be logged. As another example (e.g. as a complementary part of the same transaction) the switching performed by the financial switching engine 202 may comprise receiving a report message from a provider 210 (e.g. in response to the request) via the respective filter 208a, reading enough of the message to determine its nature as a report, and forwarding to the relevant endpoint terminal 108 via the respective filter(s) 208b, 208c, 208d. Again this may also comprise a step of sending the report or information about it to the database 218 vial DAL 220 for logging.

Filters 208 are components which perform specialized units of work (e.g. TCP/IP communication, device handlers, MasterCard online messages, etc.). In embodiments filters 208 are components which are not included within the core financial switching engine 202. They may comprise specialized processes such as device handlers (e.g. ATM, POS), network handlers (e.g., MasterCard, Visa, etc.), and other function-specific processes. Filters 202 and other non-core components may "pre-decline" a transaction, but may still be required to route into the core 202 for logging and subsequent routing. The core switching engine 202 may detect pre-declined messages and drop into a "declined decision tree" and potentially override pre-declined values.

In embodiments there may be different filter types: stand-alone filters, chained filters and embedded filters. The standalone type of filter handles a complete unit of work (e.g. MasterCard filter, etc.). Chained filters may be linked in sequence where each filter completes its unit of work and passes the results to the next filter. As for embedded filters, this concept allows a filter to be embedded within another filter so the "master" filter effectively appears to be a standalone filter. However, the master filter may in fact comprise an accumulation of other filters. Likewise, a filter embedded within a master filter may also function as a standalone filter.

The filter concept can be used to support a centralized and/or generic network filter as well as network-specific filters which handle unique network requirements (e.g., MasterCard, Visa, etc.). For example the filters 208 may comprise filters for online transaction processing, network-specific online filters, filters for network clearing processing, and/or network-specific clearing filters.

For instance for online transaction processing, a generic network filter may handle the interface layer between the core financial switching engine 202 and the network-specific online filters, while network-specific online filters handle each network's unique messaging requirements and provide the interface layer between the generic network filter and the individual networks.

Regarding the network clearing processing, a separate network clearing processes is typically used by a provider network, including the incoming/outgoing file processing logic and the clearing user interface. In embodiments however, there may be provided central clearings application, in which case the new architecture is arranged to create a generic clearing application which handles incoming/outgoing files and the clearing user interface. This is implemented by identifying the common clearing functions between all networks so the central clearings application may be designed to accommodate those needs in a generic manner. In order to facilitate the network-specific clearing requirements, the network-specific clearing filter layer will provide a layer between the central clearings application and the networks. These filters will perform network-specific reformatting between network supplied files and files handled by the central clearings application. In embodiments, these filters will accept and send data from and to the central clearings application in a standardized format. The filters will reformat data according to network and the standard messaging format.

In embodiments these filters may comprise filters specific to particular providers, e.g. MasterCard, Visa, American Express. For example MasterCard-specific filter(s) may comprise: filters specific to managing MasterCard clearing processes, a MasterCard Messaging filter and/or a MasterCard administration filter. The MasterCard Messaging filter is responsible for MasterCard-specific message handling and reformatting, and in embodiments also routing to the downstream MasterCard communication filter. The messaging filter might also monitor the downstream MasterCard communication filters at a high level to identify/report issues and node connection issues. The MasterCard administration filter handles MasterCard MIP connections, administrative messaging, and/or flexible message matching to identify response thread.

In embodiments the filters 208 may further comprise communications filter(s) for performing operation of: retrieving incoming messages from the communication line, splitting multiple messages into individual messages, handling cases where messages are split across packets, directing raw messages into the appropriate filter(s) and/or core 202, placing response messages on the communication line, maintaining a persistent connection, and/or keeping track of message-level "thread thumbprints" which indicate which thread sent the request so the communication filter is able to return responses to the correct thread. The filters 208 may further comprise ISO-8583 message filters such as: generic ISO-8583 message filter similar to the ITM Super DCM concept, Host-to-Host Interface filter(s) and/or H2H to EFTS.

The filter(s) 208a thus provide an interface with the settlement system(s) of one or more financial provider systems for performing online transaction processing and/or debit or credit card transactions. Further, as mentioned the filters 208b, 208c, 208d may comprise device handler modules for interfacing with the PoS terminals 212, ATMs 214 via their associated infrastructure. Further, there may be provided filters 208 for topping-up or redeeming prepaid account credit, by interfacing to a financial institution and a prepaid account system of the provider of the prepaid good(s) or service(s), e.g. an account of prepaid phone minutes. The financial switching engine 202 sits in the middle connected between these service endpoints 108, 212, 214, provider system(s) 210, and prepaid account(s) (not shown) via the respective filter(s) 208, and is arranged to switch messages between them as appropriate to the message in question.

The system of FIG. 2 further comprises one or more operator user terminals 224 (distinct from service endpoints 108, 212, 214) which are connected to the database 218. These provide a user interface enabling an operator of the system to access records of transactions that have been logged via the DAL 220 and switching engine 202, as well as setting any configurations or rules of the system that the system enables the operator to control. In embodiments they user interface may provide a broad number of user interfaces such as: system configuration, system management, system health monitoring, network clearing, audit and/or research.

As further illustrated in FIG. 2, the system comprises a security sub-system in the form of one or more security modules 204 for handling the cryptography involved in the transactions being performed, as well as any other security measures. This may comprise a hardware security module (HSM) providing tamperproof management of security keys. Any transactions that involve messages being conveyed between different physical data centres 106, and over any external connections to or from any of the service endpoint terminals 108 and provider systems 210, will be encrypted for security using a security key. The security module 204 performs the necessary encryption and decryption as required by the switching engine for reading and/or transmitting messages.

As mentioned previously, the functionality of the system is implemented in the form of a plurality of plugins 222. The plugins 222 comprise units of software and are modular in nature, giving the ability to be enhanced with unique and/or custom features demanded by clients. Likewise, they support the ability to augment existing functionality without changing other elements. In embodiments everything is implemented as a plugin 222, even the core financial switching engine 202 and HSM.

Hence in embodiments the plugins 222 may comprise: a plugin implementing the core financial switching engine 202, one or more plugins implementing the functionality of the one or more security modules 204 (e.g. comprising the software of the HSMs), one or more service endpoint interface plugins for interfacing with the service endpoint terminals 108 (via any associated infrastructure such as a PoS network or EFTS server), and one or more transaction processing plugins e.g. for interfacing with the provider system(s) 210. The service endpoint interface plugins may comprise a PoS plugin for interfacing with the PoS terminals 212 via the PoS network, and/or an ATM plugin for interfacing with the ATMs 214 via the ATM network (comprising the EFTS server 216). The transaction processing plugins are configured to process financial transactions by interfacing to the relevant provider system 210. The plugins may also comprise plugins for online transactions and/or prepaid account transactions. Hence the plugins 222 may implement some or all of the functionality of said filters 208.

In embodiments the DAL 220 may also be implemented as one of said plugins 222. The system may comprise one or more other plugins 222 (not shown) such as: a transaction logging plugin for logging transactions in the database 218 via the DAL 220, a reporting plugin for generating reports relating to the transactions (e.g. reporting on account activity), a protocol conversion plugin for converting between different communication protocols used throughout the system, and/or a transaction lifecycle plugin for managing the lifecycle of a transaction.

The plugins 222 can be chained together to create transactions, as will be discussed in more detail shortly.

Figure 3:
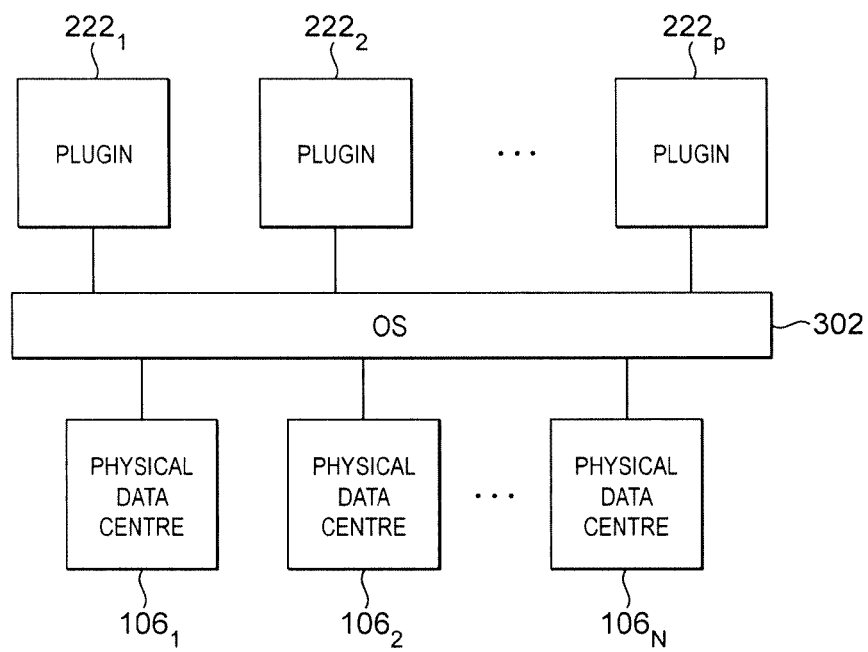

FIG. 3 now illustrates the actual physical implementation of the system, and particularly its distributed nature. The system comprises a plurality of plugins 222 (such as those discussed above) distributed amongst a plurality of physical data centres 106. The physical data centres are implemented at a plurality of different respective physical sites, e.g. different buildings, different towns or even different countries. In embodiments there may be at least three data centres, or at least ten, or multiple tens of data centres, or even over a hundred upwards. As mentioned, the data centres 106 are connected together via a private network 110, which may comprise a private network infrastructure and/or a private protocol implemented over a public network such as the Internet (sometimes called a virtual private network).

Where it is said that the plugins 222 are distributed amongst different data centres 106, this may mean one or both of two things: firstly, it may mean that different types of plugin are implemented at different data centres (e.g. the core 202 at one data centre 106 and the ATM interface 208*b* at another, etc.); and/or secondly, it may mean that different instances of a given plugin may be implemented in parallel at different data centres (e.g. so instances of the core 202 may be implemented at multiple data centres 106, and instances of the ATM interface 208*b* may be implemented at multiple data centres 106, etc.). I.e. each plugin 222 is physically stored and/or executed on one or more of the data centres 106, with different plugins 222 at least in part being stored and/or executed on different data centres, or even each plugin distributed amongst all the data centres 106. Note also that multiple instances of a given plugin 222 may also run in parallel on a given data centre 106. Instances herein can refer to different copies of the same (or substantially equivalent) plugin 222 stored at different data centres 106, or different instances of the same copy running at a given data centre (i.e. the same copy operating on different transactions in parallel).

In between the plugins 222 and physical data centres 106 there is provided an operating system 302 which is configured to abstract the plugins 222 from the underlying, physical, distributed nature of the data centres 106. This means the plugins 222 to not have, and nor do they need, any visibility of the distributed structure of the physical implementation of the system. If a given plugin 222 is to send a message destined for another plugin 222, it issues the message only to the operating system and does not specify the physical address of any data centre 106 (and nor does it have any need to do so). The physical routing of messages between the data centres 106 running the source and destination plugins 222 (or source and destination instance of the plugins) is handled by the operating system 302 without either plugin 222 needing to know about it—instead the plugin just sends the message to another plugin via the OS, without the plugins 222 needing knowledge of the different distributed data centres 106. Thus the plugins 222 handle the business logic while the operating system handles the underlying physical routing over the network 110.

The operating system 302 itself may be implemented in a distributed fashion amongst some or all of the data centres. This may comprise implementing a plugin look-up table mapping the plugins or instances of the plugins to data centres and/or recording which plugins are available, with the look-up table being distributed amongst some or all of the data centres. Alternatively the look-up could be implemented centrally. Either way, when it receives a message from a plugin 222, the operating system 302 can thus look up the actual physical destination which the message should be routed to for processing.

The operating system 302 may also be configured to perform load balancing to try to optimally balance the load of storing and/or executing the different plugins 222 or instances of the plugins 222 amongst the different data centres 106, so that no one data centre 106 bears an undue burden of the memory and/or processing resources being consumed by the system overall. The load balancing mechanism considers parameters such as: internal resources of a data centre 106 like CPU usage and memory, and external resources like TCP connection, database connection, and network latency. A run-time increase or decrease in the number of plugin instances is possible if required, and this can be performed manually or automatically. The inbuilt intelligent load balancing can operate even without a manual configuration change, but in embodiments explicit hints can be made by the operator such as: configuration queue threshold, configuring priority, configuring response time-out, configuring throughput time, and/or configuring memory consumption threshold. The load balancing may be considered a form of intelligent message routing.

Further, the operating system may be configured to perform a best-cost routing to find the best route for the messages of a transaction amongst data centres 106 over the network 110. This intelligent dispatching provides an automatic calculation of the optimal routing cost based on path latency, message queue size, processing speed, priority, plugin availability, and/or plugin response (e.g. a plugin can define its own node as a defect). The above attributes can be manually controlled by a configuration change, or automatically.

Preferably the operating system is configured to be able to interpret different scripting languages such as Java, LUA and/or C++ (used as a scripting language), and is thus configured to support plugins 222 programmed in such different languages. Preferably the system is also configured to support different communication protocols for communicating between different ones of the plugins 222 and/or between the core switching engine 202 and plugins 222. For example the communication protocols may comprise SOAP, REST, ASN.1 and/or an H2H protocol. In embodiments, the protocol conversion may be implemented by one or more of the plugins 222.

Further, the system is preferably database agnostic in that it comprises the data abstraction layer (DAL) 220, which supports multiple database types, e.g. SQL, MySQL, PostGreSQL, MS-SQL, DB2 and/or Oracle. In embodiments the DAL 220 may or may not be one of said plugins. In embodiments the database may be distributed amongst some or all of the data centres, or may be implemented centrally.

Figure 4:
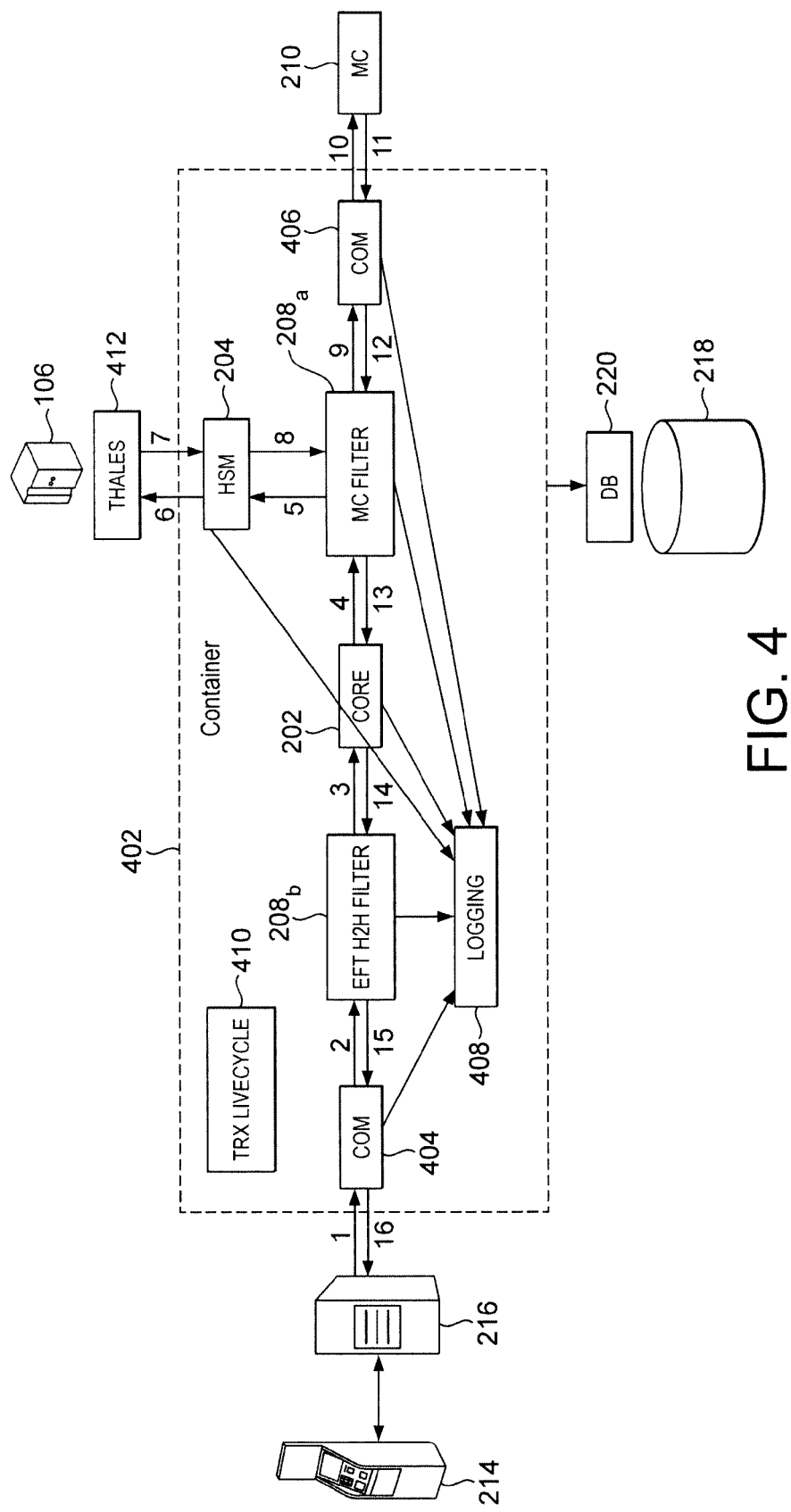

FIG. 4 illustrates an example of a plurality of plugins 222 being chained together to form a transaction, in this case a credit or debit card transaction between an ATM 214 and a credit or debit card provider 210. The transaction is formed using: an instance of a transaction lifecycle plugin 410, an instance of the core financial switching engine plugin 202, an instance of a security plugin 204, and instance of a logging plugin 408, instances of two service endpoint plugins in the form of a communication plugin 404 and an EFT H2H filter plugin 222, and instances of two transaction processing plugins in the form of a credit or debit card filter 208*a* and a communications filter 406. Plugins are loaded dynamically on a per connection basis. In embodiments the instances of the plugins 222 for a given transaction are brought together and managed over its lifecycle by the transaction lifecycle plugin 410.

The ATM 214 issues a request message to the switching core 202 via the EFTS 216 and service endpoint plugins 404, 208*a*. The switching engine 202 examines the message to determine that it is a request for a credit or debit card transaction and thus determines that it is to be directed to the system 210 of the credit or debit card provider for settlement. Accordingly, the switching engine 202 forwards the message to the credit or debit card settlement system 210 via the provider interface plugins 208*a* and 406. Once the transaction is thus settled (or declined) by the card provider system 210, it returns a response to the ATM 214 via the switch 202, interfaces 406, 208a, 208b, 4040 and ETFS 216. Each of one or more stages of the transaction may also be logged in the database 218 by the logging plugin 408, via the DAL 220. The security plugin 204 handles the encryption of the messages so that any message communicated between physical data centres 106 are duly encrypted, via the hardware 412 of an HSM.

The described system provides a general and universal real-time switch that is not limited to any particular type of transaction, interface or data format. The above example of a credit or debit card transaction is just one example case of a general architecture which can also be used for many other functions such as online transactions, prepaid account transactions, viewing an account, and/or monitoring an account to automatically generate alerts, etc.

The distribution of the modular plugins or different instances of the plugins amongst multiple distributed data centres means that multiple physical processing centres melt into one logical processing centre. This can provide a number of advantages. For example, it allows for zero downtime in case of failure or even maintenance. A single defect can be automatically be replaced by other plugins in a different location. Further, through this cloud design, real-time upgrade and configuration is made possible by implementing the upgrade at one data centre 106 without needing to change or shut down the rest of the system. Plugins 222 can be refreshed or updated during runtime even without losing connection, e.g. to replace with a new version of the plugin, change the versioned name in the plugin table, or send a refresh message to the plugin. Further, the design provides high performance and scalability, allowing the system to be scaled up just by configuration or even automatically, by adding additional plugins, plugin instances and/or data centres without needing to shut down and/or rework the rest of the system.

The system is flexible and easy to extend, with plugins being able to be developed and replaced by third parties. It provides multiple interfaces to access and manipulate data, e.g. SOAP, REST and/or ASN.1; and allows multiple script languages, even LUA. Furthermore, the system provides for automatic load balancing, memory management and an intelligent "cost of routing" calculation.

It will be understood that the system is capable of handling information in addition to financial information. Therefore the system may be considered "universal" in that it is capable of handling any type of electronic message.

The central operating system and plugin approach, as discussed above, enables a distribution of functionalities. The operating system can handle, for example, message delivery, multi-threading, plugin handling, a database abstraction layer, memory management, and performance controls. The plugins can, for example, implement business logic, and also have the ability to be chained to other plugins. Furthermore, the system may readily be implemented as a cloud based system.

Embodiments are not limited to any particular type of operating system. The operating system can for example be Linux, Windows etc. Whichever operating system is used, it can in embodiments abstract functionalities to the plugins, such as business logic.

It will be appreciated that the above embodiments have been described by way of example only. Other variations may become apparent to the skilled person given the disclosure herein. The scope of the disclosure is not limited by the described embodiments, but only by the accompanying claims.

The invention claimed is:

1. A distributed transaction system providing a switching engine and operating system-based (OS-based) message destination routing, the distributed transaction system comprising:
    a distributed plurality of different physical data centers implemented at different respective physical locations, connected together via a private network;
    a plurality of plugins, executed by one or more processors, each of the plurality of plugins configured to perform a different respective function of the distributed transaction system, wherein the system is configured to perform a run-time increase or decrease in a number of instances of the plurality of plugins to account for system requirements, wherein two or more of the plugins are chained together to enable a transaction, and at least one of the plugins comprises a transaction lifecycle plugin that is dynamically loaded to manage the two or more plugins that are chained together for a lifecycle of a transaction; and
    an operating system, executed by one or more processors, on which the plugins run, wherein the operating system is physically distributed amongst some or all of said physical data centers, and the distributed operating system implementing a plugin look-up table mapping the plugins to the plurality of different physical data centers and recording which plugins are available, the distributed operating system employing OS-based message destination routing that routes messages between the data centers over the private network, the plugins being configured to communicate messages with one another in order to perform transactions, the plugins being without destination routing visibility;
    wherein the plugins are distributed amongst some or all of the data centers and the distributed operating system is configured to separate the plugins from the distributed data centers, the plugins communicating the messages with one another via the distributed operating system without destination routing visibility of the data centers that are destinations of the messages; and
    wherein the operating system comprises a cost-of-routing algorithm configured to determine an optimal route for said messages amongst the data centers based on one or more of least availability and response of the plurality of plugins.

2. The distributed transaction system of claim 1, wherein the switching engine is one of said plugins.

3. The distributed transaction system of claim 1, wherein the plugins are configured to apply cryptography and/or one or more other security measures to ones of said transactions.

4. The distributed transaction system of claim 1, wherein the plugins include one or more endpoint interfaces each configured to interface with one or more service endpoint terminals.

5. The distributed transaction system of claim 4, wherein the one or more endpoint interfaces comprise a point-of-sale interface configured to interface with one or more point-of-sale terminals.

6. The distributed transaction system of claim 4, wherein the one or more endpoint interfaces comprise an ATM interface configured to interface with one or more automatic teller machines.

7. The distributed transaction system of claim 1, wherein the plugins include an online transaction processor.

8. The distributed transaction system of claim 1, wherein the plugins include one or more prepay transaction plugins configured to process transactions to top-up and/or redeem prepaid account credit for a prepaid good or service by interfacing with the prepaid account.

9. The distributed transaction system of claim 1, wherein the plugins include a message filtering plugin configured to filter said messages.

10. The distributed transaction system of claim 1, wherein the plugins include a reporter configured to report on ones of said transactions and/or to report on an account status.

11. The distributed transaction system of claim 1, wherein the plugins include a transaction logger for logging ones of said transactions in a database.

12. The distributed transaction system of claim 1, wherein the operating system is configured to support different communication protocols for communicating ones of said messages between plugins.

13. The distributed transaction system of claim 1 wherein the operating system is configured to interpret different programming languages in order to run different ones of the plugins programmed in the different programming languages.

14. The distributed transaction system of claim 1, comprising a database for logging ones of said transactions, and/or storing configuration parameters and/or transaction rules of the system and comprising a data abstraction layer configured to support plurality of database types.

15. The distributed transaction system of claim 14, wherein the data abstraction layer is one of said plugins.

16. The distributed transaction system of claim 1, wherein the private network comprises a private network infrastructure.

17. The distributed transaction system of claim 1, wherein the private network comprises a private protocol implemented over a public network infrastructure.

18. A computer program product providing a switching engine and operating system-based (OS-based) message destination routing, the computer program product comprising code embodied on a non-transitory computer-readable storage medium and configured so as when executed by one or more processors, the one or more processors perform operations of:
  acting as an operating system to run a plurality of plugins each configured to perform a different respective function of a distributed transaction system, wherein the system is configured to perform a run-time increase or decrease in a number of instances of the plurality of plugins to account for system requirements, the distributed transaction system comprising a distributed plurality of different physical data centers implemented at different respective physical locations, connected together via a private network, wherein two or more of the plugins are chained together to enable a transaction, and at least one of the plugins comprises a transaction lifecycle plugin that is dynamically loaded to manage the two or more plugins that are chained together for a lifecycle of a transaction, and wherein the operating system is physically distributed amongst some or all of said physical data centers, and the distributed operating system implementing a plugin look-up table mapping the plugins to the plurality of different physical data centers and recording which plugins are available; and
  communicating messages between the plugins in order to perform transactions, the distributed operating system employing OS-based message destination routing that routes messages between the data centers over a private network, the plugins being without destination routing visibility;
  wherein the plugins are distributed amongst some or all of the data centers and the distributed operating system is configured to separate the plugins from the distributed data centers, the plugins communicating the messages with one another via the distributed operating system without destination routing visibility of the data centers that are destinations of the messages, and
  wherein the operating system comprises a cost-of-routing algorithm configured to determine an optimal route for said messages amongst the data centers based on one or more of least availability and response of the plurality of plugins.

19. The distributed transaction system of claim 1, wherein the distributed transaction system comprises a distributed financial transaction system and the switching engine comprises a financial switching engine.

20. The distributed transaction system of claim 1, wherein the operating system comprises a load management algorithm configured to perform load balancing between the data centers.

* * * * *